United States Patent [19]

Kerscher et al.

[11] Patent Number: 4,562,383

[45] Date of Patent: Dec. 31, 1985

[54] CONVERTER

[75] Inventors: Max Kerscher, Chieming; Armin Kröning, Seebruch, both of Fed. Rep. of Germany

[73] Assignee: Siemens Aktiengesellschaft, Berlin & Munich, Fed. Rep. of Germany

[21] Appl. No.: 474,579

[22] PCT Filed: Jul. 29, 1982

[86] PCT No.: PCT/DE82/00155

§ 371 Date: Feb. 7, 1983

§ 102(e) Date: Feb. 7, 1983

[87] PCT Pub. No.: WO83/00587

PCT Pub. Date: Feb. 17, 1983

[30] Foreign Application Priority Data

Jul. 31, 1981 [DE] Fed. Rep. of Germany ....... 3130424
Sep. 30, 1981 [DE] Fed. Rep. of Germany ....... 3138994

[51] Int. Cl.[4] .................... H05B 37/02; H05B 39/04; H05B 41/36

[52] U.S. Cl. .......................... 315/225; 315/DIG. 5; 315/DIG. 7; 315/227 R; 315/307; 323/222; 323/226

[58] Field of Search ............... 315/225, 227, 307, 308, 315/206, DIG. 5, DIG. 7; 323/222, 226

[56] References Cited

U.S. PATENT DOCUMENTS

| 3,611,021 | 10/1971 | Wallace | 315/307 |
| 3,896,336 | 7/1975 | Schreiner et al. | 315/DIG. 7 |
| 3,969,652 | 7/1976 | Herzog | 315/308 |
| 3,999,100 | 12/1976 | Dendy et al. | 315/DIG. 5 |
| 4,042,856 | 8/1977 | Steigerwald | 315/307 |
| 4,188,661 | 2/1980 | Bower et al. | 315/DIG. 7 |
| 4,199,710 | 4/1980 | Knoll | 315/DIG. 7 |
| 4,251,752 | 2/1981 | Stolz | 315/206 |
| 4,392,085 | 7/1983 | Knoll et al. | 315/DIG. 7 |

FOREIGN PATENT DOCUMENTS

| 0444172 | 12/1973 | U.S.S.R. | 323/222 |
| 0691819 | 10/1979 | U.S.S.R. | 323/222 |

Primary Examiner—Saxfield Chatmon
Attorney, Agent, or Firm—Hill, Van Santen, Steadman & Simpson

[57] ABSTRACT

The invention relates to an inverter, in particular, for the feeding of a discharge lamp, comprising a rectifier, a charging regulator with a charge inductor, a charging diode, a charging switch, as well as a charging condenser. An alternating voltage converter is provided with at least two alternately through-connected switches, designated as primary and secondary switches, which are in series connection parallel to the charging condenser. A simple control of the charging switch is provided with an automatic blocking of the charging switch upon disconnection of the alternating voltage converter. For this purpose the control of the charging switch by a square wave voltage is synchronized on one of the switches of the alternating voltage converter.

7 Claims, 5 Drawing Figures

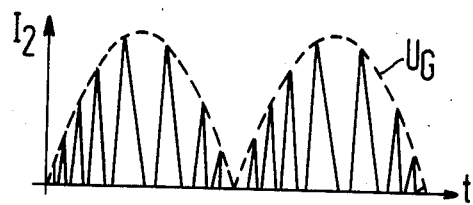
FIG 2
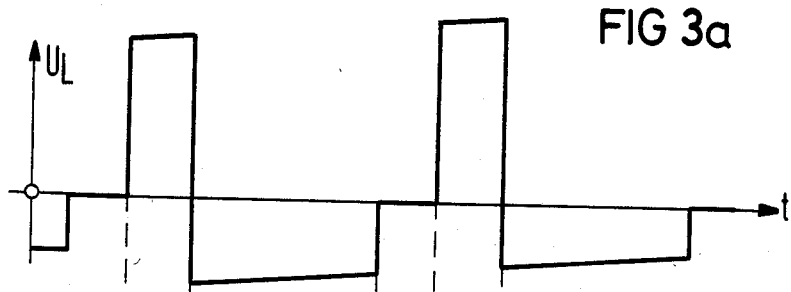
FIG 3a
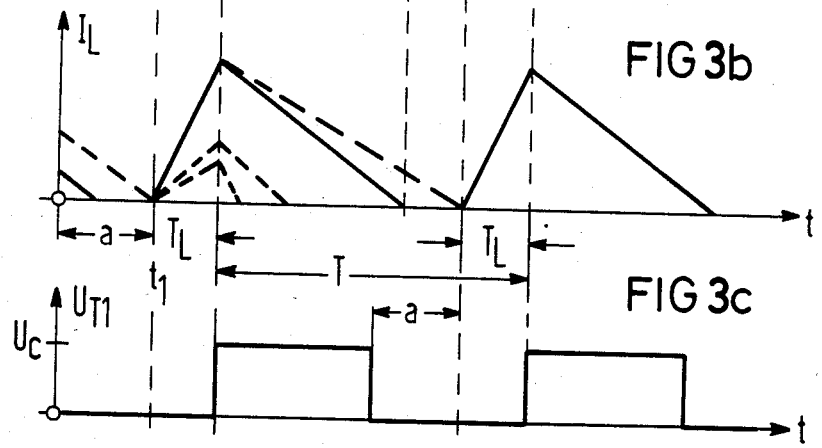
FIG 3b
FIG 3c

CONVERTER

BACKGROUND OF THE INVENTION

1. Field of the Invention

The present invention relates to an inverter with a rectifier which is powered by an alternating-current (AC) voltage supply, and which delivers substantially a half-wave rectified voltage. A charging regulator is provided incorporating a charging condenser connected through a charging diode and a charging inductor to the rectifier, as well as a charging switch which is periodically closed by a control component with a variable keying ratio to connect the charging inductor to the rectifier. The inverter includes an AC voltage converter with two alternatingly controlled switches supplied with power by the charging condenser, hereafter identified as the primary switch and the secondary switch, which are in a series circuit in parallel with the charging condenser. In this arrangement the switching frequency of the charging switch and also of the AC voltage converter are higher than the frequency of the AC voltage supply.

2. Discussion Of The Prior Art

An inverter of this type is described in U.S. Pat. No. 4,251,752, incorporated herein by reference, in which the keying ratio for control of the charging switch is determined by a regulator which has the half-wave voltage of the rectifier coupled thereto as a reference value. This occurs, however, in a relatively complicated circuit.

In such a circuit the charging regulator should be deactivated when no energy is withdrawn from the charging condenser, for example, during non-oscillating periods of the alternating voltage converter.

SUMMARY OF THE INVENTION

Accordingly, it is an object of the present invention to simplify the control of the charging switch in an inverter of the above-mentioned type; in particular, a design is provided such that the charging regulator will automatically switch off at a non-oscillating condition of the alternating voltage converter and operate with as low a loss as possible.

The foregoing object is achieved by the invention as described herein for an inverter of this type in that the control component for the charging switch of the charging regulator is synchronized with the square wave voltage at one of the switches of the alternating voltage converter.

Thus, in accordance with the present invention, the charging switch operates at the same switching frequency as the alternating voltage converter, and the control voltage for the charging switch, for example, across a capacitative voltage divider, is taken from the square-wave voltage at a switch of the alternating voltage converter. When this voltage terminates during a non-oscillating condition of the alternating voltage converter, then the charging switch of the charging regulator also remains open. At a disruption, accordingly only the alternating voltage converter need be deactivated.

The keying ratio of the actuation switching period of the charging switch relative to the total period interval determines the voltage on the charging condenser and also has an effect on the waveform of the supply current. This keying ratio is preferably determined by the charging period of a delay storage element, particularly a delay condenser. The charging or discharging circuit associated with the condenser includes one of the switches of the alternating current voltage converter for synchronizing.

Pursuant to a first embodiment of the present invention, the actuation period of the charging switch extends to the end of the square-wave voltage on one of the switches of the alternating voltage converter, and its commencement is determined through the end of the charging period of the delay storage element at a response value which begins with the commencement of the above square-wave voltage. The actuation period is thus smaller than the half period interval by the charge period of the delay storage element.

With the prerequisite that the mean voltage on the charging condenser should be only slightly larger than the peak value of the half-wave voltage of the rectifier, the discharge voltage (difference between the voltages on the charging condenser and on the rectifier) of the charging inductor varies very greatly within a half-wave of the supply alternating voltage. At a constant keying ratio, this leads to deviations of the supply current from a sinusoidal form.

In order to avoid this, the keying ratio has, in a known manner as disclosed by German Laid-open Patent Application No. 26 52 275, incorporated herein by reference, in the middle region of each half-wave of the half-wave voltage of the rectifier a minimum value, and in the first and last third of the half-wave, a maximum value, and varies therebetween in controlled dependency upon the instantaneous value of this half-wave voltage or the voltage on the charging condenser. The minimum value is preferably designed or chosen such that the charging inductor, at rated voltage on the charge condenser and charged at its rated load, can be fully discharged before each charge. Furthermore, it is advantageous that the keying ratio is also dependent upon the median value of voltage on the charging condenser in order to maintain this voltage as constant as possible.

The operation of the converter with semiconductor elements additionally requires voltages at a low level. In accordance with a further advantageous modification of the present invention, the circuit is extensively loss-free through the use of a voltage divider formed by two condensers which are arranged in parallel with one of the switches of the alternating voltage converter and also limit the voltage rise upon opening of the switch. This aids in the utilization of transistors as switches by lowering the switching-off losses.

The alternating voltage converter which is supplied by the charging regulator can be constructed as a bridge circuit with four switches or with two switches and two condensers; preferably, however, this relates to a reversing alternating voltage converter with only two switches and one load branch, which is connected in parallel with the secondary switch, and has in series a reversing condenser, the load, a series resonant circuit, and the primary winding of a saturation transformer. The saturation transformer includes secondary windings for the alternating control of the two switches of the alternating voltage converter, whereby the operating frequency of the alternating voltage converter, which is determined by the saturation transformer, is somewhat above the resonant frequency of the series resonant circuit. When utilizing transistors as the switches in connection with the known anti-parallel connected return flow diodes, this assures an avoidance of an overlapping of the switching periods of the transistors. The starting pulse is conducted from a trigger condenser through a trigger diode to the primary switch of the alternating voltage converter.

The inverter is primarily designed for the operation of discharge lamps with preheatable electrodes, wherein the condenser of the series resonant circuit is always placed between the two electrodes of one discharge lamp. Accordingly, for a continually ignition resistant lamp, provision must be made for switching-off of the inverter.

A bistable switching device which serves this purpose is connected through by a trigger signal and includes a maintaining current circuit through which this switch condition is maintained until interruption of the maintaining current circuit. Inventively, this maintaining current circuit and the charging current circuit of a starting condenser includes therein one of the electrodes of the discharge lamp or the series circuit of two electrodes in a two-lamp circuit. During a lamp change, the switched-off condition is automatically terminated, and the lamp operation is again resumed without the entire illuminated installation having to be switched off.

Preferably serving as a switch installation is a stop thyristor which short circuits the starting condenser and a switch-off winding of the saturation transformer in the case of a continually ignition resistant lamp, and thereby deactivates the alternating voltage converter and indirectly therewith also the charging regulator. This condition is maintained up to the interruption of the maintenance current of the stop thyristor. The maintenance circuit for this purpose is connected via an electrode of the discharge lamp and a resistor to the supply voltage, for example the charge condenser. Upon a changing of the lamp, this current circuit is forceably interrupted and the short circuit terminated. After the insertion of a new lamp the starting condenser can again charge and the inverter automatically reassumes its operation.

BRIEF DESCRIPTION OF THE DRAWINGS

Reference may now be had to the following detailed description of two sample embodiments of the invention, taken in conjunction with the accompanying drawings, in which:

FIG. 2 illustrates a plot of the half-wave voltage of the rectifier G (in dashed lines) and the cycle of the current $I_1$ through a charge inductor;

FIG. 3a illustrates the cycle of the voltage $U_1$ on the charge inductor;

FIG. 3b shows the current $I_1$ through the charge inductor; and

FIG. 3c illustrates the phase of the synchronized square-wave voltage $U_{T1}$ in the sample embodiment according to FIG. 1.

DETAILED DESCRIPTION OF THE PREFERRED EMBODIMENTS

Figure 1:
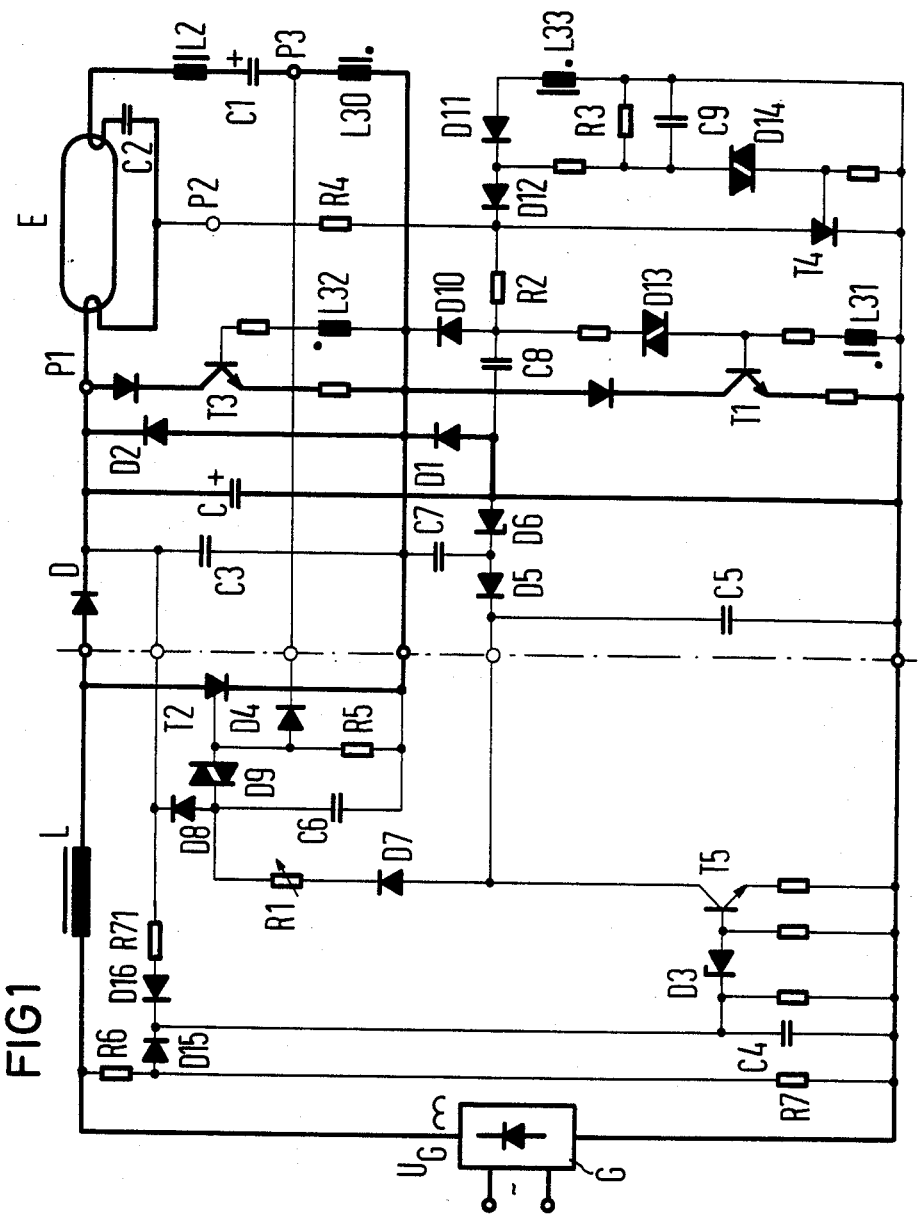
FIG. 1 illustrates a first embodiment of an inverter circuit pursuant to the present invention.

Referring to FIG. 1, a rectifier G is coupled in a two way circuit at its input through a filter (not shown) to an alternating voltage supply (220 volts/50 cycles), and supplies power at its output to a charging condenser C through a charging inductor L and a charging diode D. An alternating voltage converter is coupled in parallel with capacitor C, and comprises two alternatingly connected transistors in a series circuit. The transistor T3 connecting to a charging diode D is designated hereafter as the secondary transistor, and the other transistor T1 is designated as the primary transistor. Connected in parallel with the secondary transistor T3 is a load branch with a discharge lamp E, a series resonant circuit C2, L2, a reversing condenser C1, and the primary winding L30 of a saturation transformer, all in a series circuit. The condenser C2 of the series resonant circuit is located between the two preheatable electrodes of the discharge lamp E, which has one electrode connected directly to the charging condenser C.

The saturation transformer includes two secondary windings L31, L32, as well as a switch-off winding L33. The secondary windings L31, L32 are connected in the control circuits of the primary and secondary transistors T1, T3 such that they are alternatingly controlled during the remagnetization or resaturation period of the saturation transformer. The saturation transformer is selected such that the operating frequency of the alternating voltage converter, which is determined thereby, is somewhat above the resonant frequency of the series resonant circuit. This produces time gaps between sequential control pulses, such that a concurrent conductance of the primary and secondary transistors, and thus a short circuiting of the voltage on the charging condenser C, is precluded. To allow current to flow during the time period of concurrent blocking of both transistors, current return diodes D1, D2 are provided in parallel with each of the transistors. During the conductive period of the primary transistor T1, the voltage of the charging condenser is applied to the load branch and charges the reversing condenser C1 with the polarity indicated in FIG. 1.

After blocking of transistor T1, current flows through the load branch, driven by the inductor L2 of the series resonant circuit, and flows through the return current diode D2 until transistor T3 is actuated. Thereafter, the reversing condenser C1 discharges through transistor T3 and the load branch until T3 is again blocked. Thereafter, the load current flows in the same direction across the charge condenser C and the return current diode D1 until the renewed actuation of transistor T1. The cycle of the square wave voltage $U_{T1}$ on the primary transistor is illustrated (in an idealistic case) in FIG. 3c.

The electrical energy which is discharged from the charging condenser C during operation of the converter is conducted to recharge the capacitor C from the voltage present across rectifier G, said voltage being coupled to capacitor C through the charging inductor L and the charging diode D. In the exemplary embodiment of FIG. 1, for this purpose, the primary transistor T1 and a charging thyristor T2 in a series circuit form a load charging switch which is coupled in parallel with the rectifier G through the charging inductor L. Preferably the charging thyristor T2 has a construction which does not block in the reverse direction, but functions like a diode. In this instance, the return current diode D2 can be eliminated since its function is assumed by the charging thyristor T2 in a series circuit with D.

A triggering of the charging thyristor T2 is possible only during conductive periods of the primary transistor T1 of the alternating voltage converter accordingly at the timepoint T1 at the end of a delay period "a" subsequent to the actuation timepoint $t_0$ to T1 (refer to FIGS. 3a through 3c). Until a renewed blocking of T1 the charging inductor is connected to the half-wave voltage of the rectifier G and takes up energy which it discharges after the blocking of T1 through the charging diode D to the charging condenser C or respectively the alternating voltage converter connected thereto and its appliances. The charging and discharging of the charging inductor are thereby synchronized with the switching sequences of the converter, which oscillates, for example, at 40 khz. With the same frequency the charging inductor is charged and discharged during half-waves of the half-wave voltage delivered by the rectifier G, whereby the current $I_L$ through the charging inductor has the schematically illustrated cycle of FIG. 3b. The current pulses are integrated by the filter ahead of the rectifier to a generally sinusoidal supply current, such that the filter, because of the high switching frequency, can be relatively small.

FIGS. 3a and 3b illustrate on an enlarged scale a cycle of the voltage $U_L$ at the charging inductor L and its current $I_L$ during a charging and discharging cycle. The charging inductor L is always charged to the instantaneous value of the half-wave voltage, as a result of which the rise of the charging current correspondingly varies. In contrast therewith, for discharging of the inductor, the difference between the instantaneous value of the half-wave voltage and the practically constant voltage on the charging condenser C is significant, so that the longest possible discharging period at a maximum instantaneous value is obtained. The keying ratio V of the actuation period $T_L$ of the charging switch to the period interval T depends upon the delay period "a" for triggering of the charging thyristor T2 with respect to the actuation timepoint $t_o$ of the primary transistor T1. It is to be selected such that the maximum energy stored by the charging inductor, in effect at the point in time of the maximum value of the half-wave voltage, can discharge completely through the charging diode D prior to its subsequent charging. Only then, upon triggering of the charging thyristor T2, will there be no return current through the charging diode D and hence a switching of the charging thyristor without any loss. Furthermore it is possible only then to achieve the smallest possible dimension for the charging inductor.

Charging thyristor T2 is controlled synchronously by the switching sequences of the converter. For this purpose its control section is coupled through a trigger diode (DIAC) D9 to a delay condenser C6 which is connected in parallel (1) through a discharge diode D8 to the secondary transistor T3, and (2) through the primary transistor T1, an adjustable discharge resistor R1, and an isolation diode D7, to a control voltage source. This control voltage source consists of a control transistor T5 and a storage condenser C5 arranged in parallel therewith. Together with a diode D5 and a divider condenser C7 this storage condenser forms a voltage divider coupled in parallel with the primary transistor T1, which is correspondingly charged periodically through T3 and discharged through T1. In this manner there is produced at capacitor C5 a practically loss-free lower operating voltage, tapped off the high voltage on the charging condenser C, the amplitude of which is limited by a Zener diode D6 which concurrently serves to discharge C7. Capacitors C5 and C7 concurrently limit the voltage rise across T1, and effectively provide deactivation unloading.

When secondary transistor T3 is conducting, the charging thyristor T2 is rapidly blocked through R5, D4, and the delay condenser C6 is discharged through D8. The charging thereof commences at the beginning of the conducting control action of the primary transistor T1 at this timepoint. From that time on the storage condenser C5 discharges through D7, R1, and the primary transistor T1, into the delay condenser C6, whose voltage, after a delay period "a" adjustable at R1, reaches a value at which the trigger diode D9 will activate and trigger the charging thyristor T2. This simple, synchronized control of the charging thyristor is also advantageous inasmuch as the delay condenser C6 will assume a higher potential than the storage condenser C5.

An essentially constant operating voltage is present on the storage condenser C5 which also serves for a constant time delay "a". The related different-length discharge periods of the charging inductor lead, however, to a deviation of the current charged from the alternating voltage supply from the sinusoidal form, which is greater the less the voltage present on the charging condenser lies above the maximum value of the half-wave voltage of the rectifier. As a result, the supply current at the beginning and at the end of each half-wave is somewhat lower, and in the middle range somewhat higher, than the value of the sinusoidal current. However, an extensive approximation can be achieved through variation of the control voltage on the control condenser C5 in dependence upon the magnitude of the half-wave voltage; for this purpose, a control transistor T5 is connected in parallel with the storage condenser C5, and the control gate of transistor T5 is connected through a Zener diode D3 to an RC network and also through a diode D15 to R6, R7 in parallel with the rectifier G. This circuitry is designed and selected such that the transistor T5 is controlled only in the middle range of each half-wave of the half-wave voltage of the rectifier G through the Zener diode D3, and thereby reduces the voltage on the control condenser C5. Consequently, in this middle range a delay period "a" results which increases with the instantaneous value of the half-wave voltage, thus providing a shorter current pulse S and thereby reduced energy absorbed by the charging inductor. With this arrangement, at the beginning and the end of each half-wave, the delay period can be selected to be smaller to thereby increase the current pulses which are taken up by the supply, without altering the desired mode of operation of the complete remagnetization of the charging inductor. This arrangement then results in a supply current which will have an approximately sinusoidal form.

The delay period "a" is further influenced in dependence upon the cycle and the magnitude of the voltage on the charging condenser C; for this purpose the RC circuit at the control section of the control transistor T5 is connected through a diode D16 and a resistor R71 also to the charging condenser C. The condenser C4 of the RC circuit thereby serves for additional smoothing and such a phase displacement that the somewhat wavy (100 Hz) DC voltage extends therewith approximately synchronized to the supply alternating current voltage. Accordingly, when the voltage on the charge condenser C3 rises above a value determined through the voltage divider and the Zener diode D3, then the delay period is increased through T5 and thus the duration of the charge of the charging inductor is reduced in the middle region of each half-wave of the supply AC voltage, which results in an additional improvement in the sinusoidal shape of the supply current.

By means of the described regulation, the voltage on the charge condenser also cannot exceed a predetermined limiting value when there is connected thereto no load or a load which is too low; for example, a lamp of too low a power output.

The reversing converter, and thereby concurrently the charging regulator only begin to operate when the voltage on a starting or triggering condenser C8 has achieved such a value that its energy is connected through a trigger diode D13 to the control section of the primary transistor T1, whereby the latter is actuated. The starting condenser C8 is connected on one side through resistors R2, R4 and one electrode of lamp E to the charging condenser C, and is connected on the other side through a diode D10 in parallel to the switching section of the primary transistor T1. After the application of the supply Ac voltage to the rectifier, the charging condenser C charges through the charging inductor and the charging diode, and thus the starting condenser C8 will be charged until the primary transistor T1 is triggered (through D13). Concurrently therewith, the starting condenser is again discharged through D10 so that this starting circuit is no longer engaged during periodic oscillations of the alternating voltage converter.

During operation of the inverter with a discharge lamp E, provision must be made for turning off of the inverter when the discharge lamp is continually unable to start, so that this results in repeated, unsuccessful attempts at starting. For this purpose a stop thyristor T4 is provided which has connected parallel therewith a switch-off winding L33 of the saturation transformer through diodes D11, D12, and is connected in parallel to the triggering condenser C8 through R2. Thyristor T4 receives its holding current through the electrode of the discharge lamp adjacent the charging condenser C and a resistor R4.

An RC circuit R3, C9 is also connected in parallel to the switch-off winding L33 through diode D11, which is also coupled through a trigger diode D14 in parallel with the control section of the stop thyristor T4. The function and design of this circuit is based on the fact that the amplitude of the current flowing through the load branch with the discharge lamp, sensed by the switch-off winding L33, in the case of an unignited lamp (resonance drop), is substantially larger than that for an ignited lamp (attenuated resonant circuit). Subsequent to a given number of unsuccessful starting attempts determined by the circuit parameters, C9 will have been charged to such an extent that the stop thyristor will trigger through the trigger diode D14 and short circuit the switch-off winding L33. This arrangement eliminates the control voltages for the transistors of the inverter, and the operation of the inverter is interrupted. However, neither the normal ignition attempts nor the normal lamp current will lead to such a switching-off, since the voltage at C9 will not attain the value required for the activation of the trigger diode D14.

Because of the synchronized control of the charging regulator in dependence upon the square-wave voltage at the switches of the alternating voltage converter, the charging regulator is again automatically switched off with the converter and again switched on after the start of the converter.

The alternating voltage converter remains switched off until the holding current of the stop thyristor T4 is interrupted, and can thereby again proceed into the blocked condition. For this purpose, the supply alternating current voltage can, for example, be switched off. However, quite frequently the switching off is the result of a defective lamp, which can be replaced without switching off of the supply voltage. Since also the current circuit of the starting condenser C8 is conducted across an electrode of the lamp, the inverter will again automatically activate after the insertion of a new lamp.

The herein described monitoring and the switching-off is advantageously applicable in the case of an alternating voltage converter and charging regulator, the control of which differs from that described in this application.

Although various minor modifications might be proposed by those skilled in the art, it will be understood that we wish to include within the claims of the patent warranted hereon all such changes and modifications as reasonably come within our contribution to the art.

We claim as our invention:

1. An inverter for use with a dc voltage source, comprising:
   a dc-regulator formed of a charging capacitor connected through a charging diode and a charging inductor to said dc voltage source, and a charging circuit connected for charging the inductor wherein the dc-voltage source and a charging switch are connected in series;
   a converter supplied by said charging capacitor and having alternatingly closing switches which are a primary switch and a secondary switch connected in series with each other and parallel to said charging capacitor; and
   a control means for periodically closing the charging switch dependent on a square-wave voltage at said primary switch, said control means comprising a delay storage element arranged in a control charging circuit and in a control discharging circuit, the control charging circuit including said primary switch and the control discharging circuit including said secondary switch.

2. An inverter according to claim 1 wherein the control charging circuit further includes in a series circuit a resistor, diode, and a control voltage source comprising a storage capacitor and a control transistor connected in parallel to the storage capacitor, said control transistor being controlled by a control signal.

3. An inverter according to claim 2 wherein said delay storage element is a delay capacitor controlling a thyristor through a trigger diode, said thyristor being located in a series circuit with said primary switch of said converter which is included in the control charging circuit and is forming with said thyristor said charging switch.

4. An inverter according to claim 2 wherein the dc voltage source comprises a rectifier which delivers an unsmoothed half-wave voltage, and wherein the control means provides a switching frequency of the charging switch which is higher than a frequency of an AC voltage feeding the rectifier, and wherein said control signal of the control transistor of the control means is dependent upon an instantaneous value of the half-wave voltage of the rectifier.

5. In an inverter for feeding at least one load circuit wherein said load circuit contains a series resonant circuit formed of a capacitor and inductor and a discharge lamp with two electrodes, said two electrodes lying in said load circuit such that said capacitor of said series resonant circuit is positioned between said two electrodes, and first and second alternately periodically switching devices being provided, one of which connects said load circuit to a dc voltage source and the other of which lies parallel to said load circuit, wherein the improvement comprises:
- a bistable switch means having an operating mode and a shutdown mode and means connected to the bistable switch means for keeping the inverter shut down during said shutdown mode and operating during the operating mode;
- holding circuit means connected to said bistable switch means for holding it in its shutdown mode, one of said electrodes of said discharge lamp lying in said holding circuit means; and
- a control circuit being connected to said bistable switch means including an RC circuit connected for being charged dependent on at least one of the parameters current or voltage of said load circuit and being dimensioned such that said bistable switch means flips into said shutdown mode given a non-triggering discharge lamp.

6. An inverter according to claim 5 further including a start capacitor connected in parallel with a control path of one of said first and second switching devices via a trigger-diode, and a charging circuit of said start capacitor including an electrode of the discharge lamp.

7. An inverter according to claim 5 wherein the first and second switching devices are controlled by a saturation transformer, a primary winding of which is included in said load circuit and wherein said bistable switch means includes a stop thyristor having a switching section and a control section, the control section being connected through a trigger diode to said RC circuit, and said switching section being included in the holding circuit means and connected through a diode to a winding of the saturation transformer.

* * * * *